(12) United States Patent
Nieves

(10) Patent No.: US 10,661,843 B1
(45) Date of Patent: May 26, 2020

(54) PICKUP TRUCK WITH DROP-DOWN SIDE PANELS

(71) Applicant: Samuel Nieves, Clarksville, TN (US)

(72) Inventor: Samuel Nieves, Clarksville, TN (US)

(*) Notice: Subject to any disclaimer, the term of this patent is extended or adjusted under 35 U.S.C. 154(b) by 86 days.

(21) Appl. No.: 16/106,316

(22) Filed: Aug. 21, 2018

(51) Int. Cl.
*B62D 33/027* (2006.01)

(52) U.S. Cl.
CPC ................ *B62D 33/0276* (2013.01)

(58) Field of Classification Search
CPC .................................................. B62D 33/0276
See application file for complete search history.

(56) References Cited

U.S. PATENT DOCUMENTS

| | | |
|---|---|---|
| D300,522 S | 4/1989 | Wegner |
| 6,644,708 B1 | 11/2003 | Grzegorzewski |
| 6,758,514 B1 | 7/2004 | Walkden |
| 7,059,666 B2 | 6/2006 | Harrison |
| 7,506,909 B2 | 3/2009 | Barnes |
| 9,227,675 B1 | 1/2016 | Elquest |
| 9,511,803 B2 | 12/2016 | Wassell |
| 2005/0093339 A1* | 5/2005 | Klassen ............... B62D 33/03 296/183.1 |
| 2007/0222247 A1 | 9/2007 | Jaeck |

FOREIGN PATENT DOCUMENTS

WO 2004089671 A 1/2006

* cited by examiner

*Primary Examiner* — D Glenn Dayoan
*Assistant Examiner* — Melissa Ann Bonifazi
(74) *Attorney, Agent, or Firm* — Kyle A. Fletcher, Esq.

(57) ABSTRACT

The pickup truck with drop-down side panels is a truck with side walls and a tailgate that may be raised and lowered to transform the truck between a pickup truck and a flatbed truck. The drop down left side panel, drop down right side panel, and drop down tailgate each comprise one or more height adjusters. An individual height adjuster may comprise a track gear coupled to the panel to be moved, a motor coupled to the chassis of the truck, and a drive gear coupled to the shaft of the motor. The teeth of the track gear mesh with the teeth of the drive gear such that rotation of the motor in a first diction lowers the panel to a down position and rotation of the motor in a second direction lifts the panel to an up position.

17 Claims, 6 Drawing Sheets

PICKUP TRUCK WITH DROP-DOWN SIDE PANELS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cargo vehicles, more specifically, a pickup truck with drop-down side panels.

SUMMARY OF INVENTION

The pickup truck with drop-down side panels is a truck with side walls and a tailgate that may be raised and lowered to transform the truck between a pickup truck and a flatbed truck. The drop down left side panel, drop down right side panel, and drop down tailgate each comprise one or more height adjusters. An individual height adjuster may comprise a track gear coupled to the panel to be moved, a motor coupled to the chassis of the truck, and a drive gear coupled to the shaft of the motor. The teeth of the track gear mesh with the teeth of the drive gear such that rotation of the motor in a first diction lowers the panel to a down position and rotation of the motor in a second direction lifts the panel to an up position.

An object of the invention is to provide a truck that transforms between a pickup truck and a flatbed truck by raising and lowering side panels and a tailgate.

Another object of the invention is to raise and lower individual side panels and the tailgate using one or more height adjusters comprising a track gear, drive gear, and a motor.

A further object of the invention is to provide a slotted bumper through which the tailgate may be lowered.

Yet another object of the invention is to control the height of the side panels and tailgate from within the cab of the truck.

These together with additional objects, features and advantages of the pickup truck with drop-down side panels will be readily apparent to those of ordinary skill in the art upon reading the following detailed description of the presently preferred, but nonetheless illustrative, embodiments when taken in conjunction with the accompanying drawings.

In this respect, before explaining the current embodiments of the pickup truck with drop-down side panels in detail, it is to be understood that the pickup truck with drop-down side panels is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pickup truck with drop-down side panels.

It is therefore important that the claims be regarded as including such equivalent construction insofar as they do not depart from the spirit and scope of the pickup truck with drop-down side panels. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
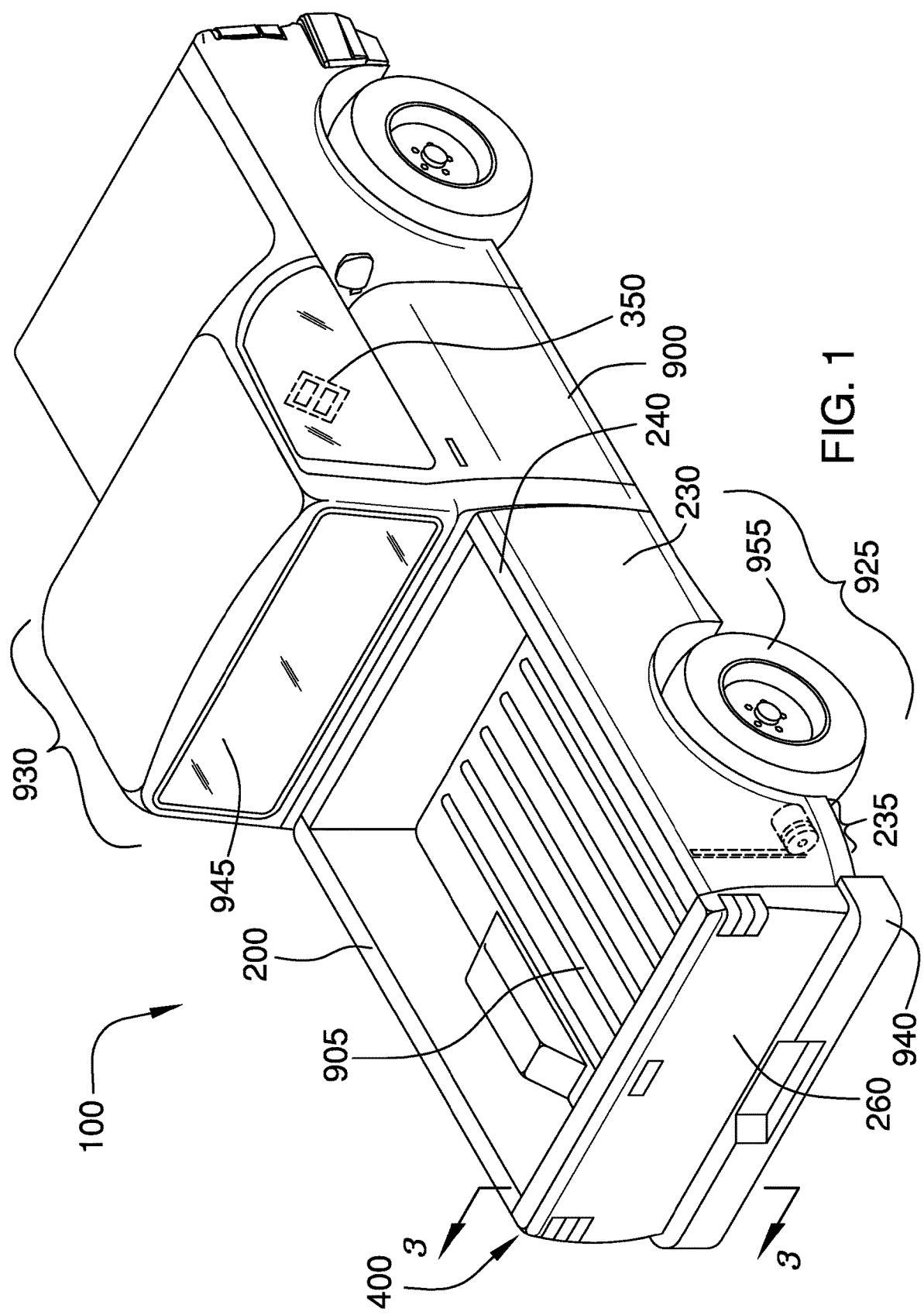
FIG. 1 is a perspective view of an embodiment of the disclosure illustrating the pickup truck configuration.
Figure 2:
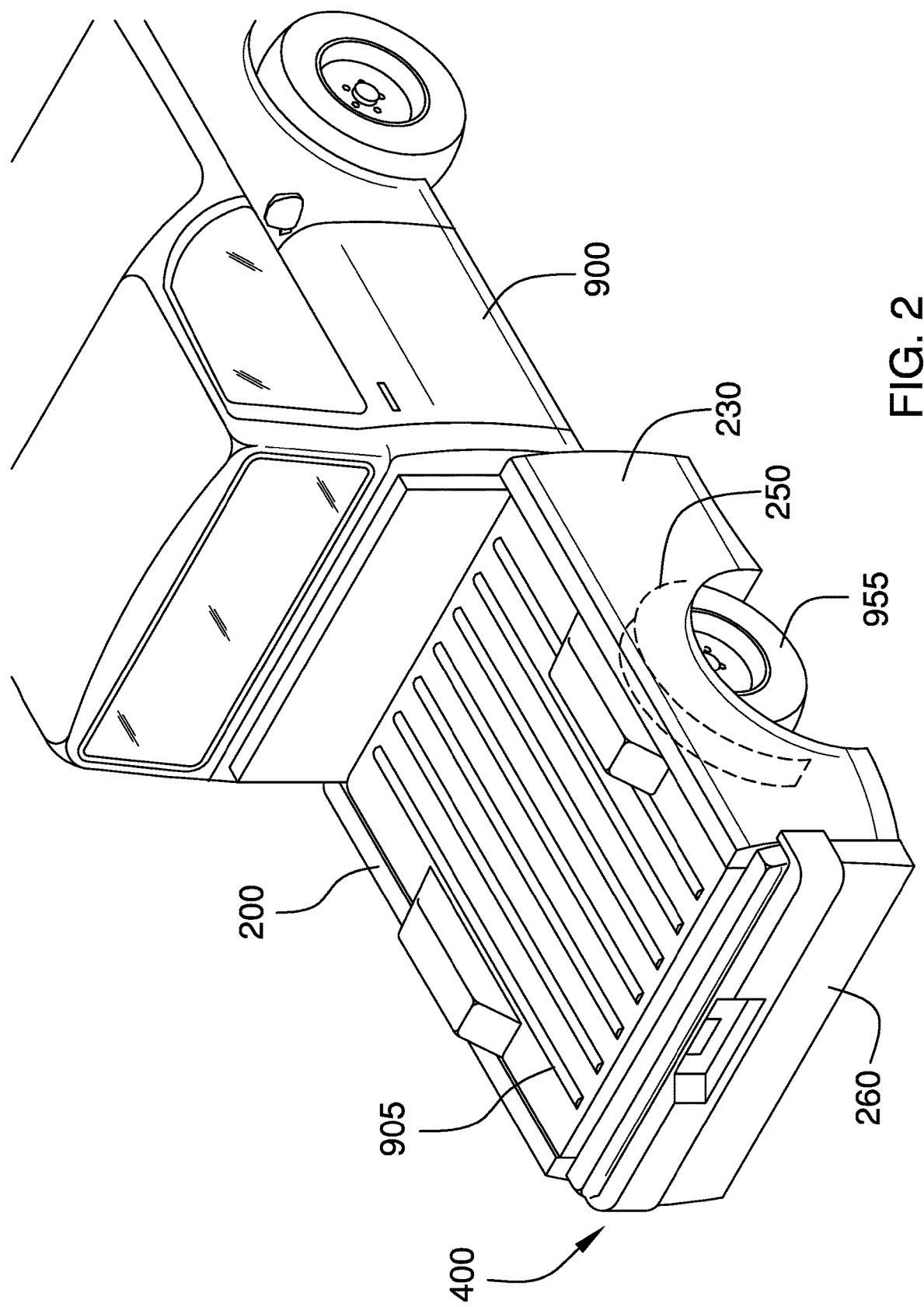
FIG. 2 is a perspective view of an embodiment of the disclosure illustrating the flatbed truck configuration.
Figure 3:
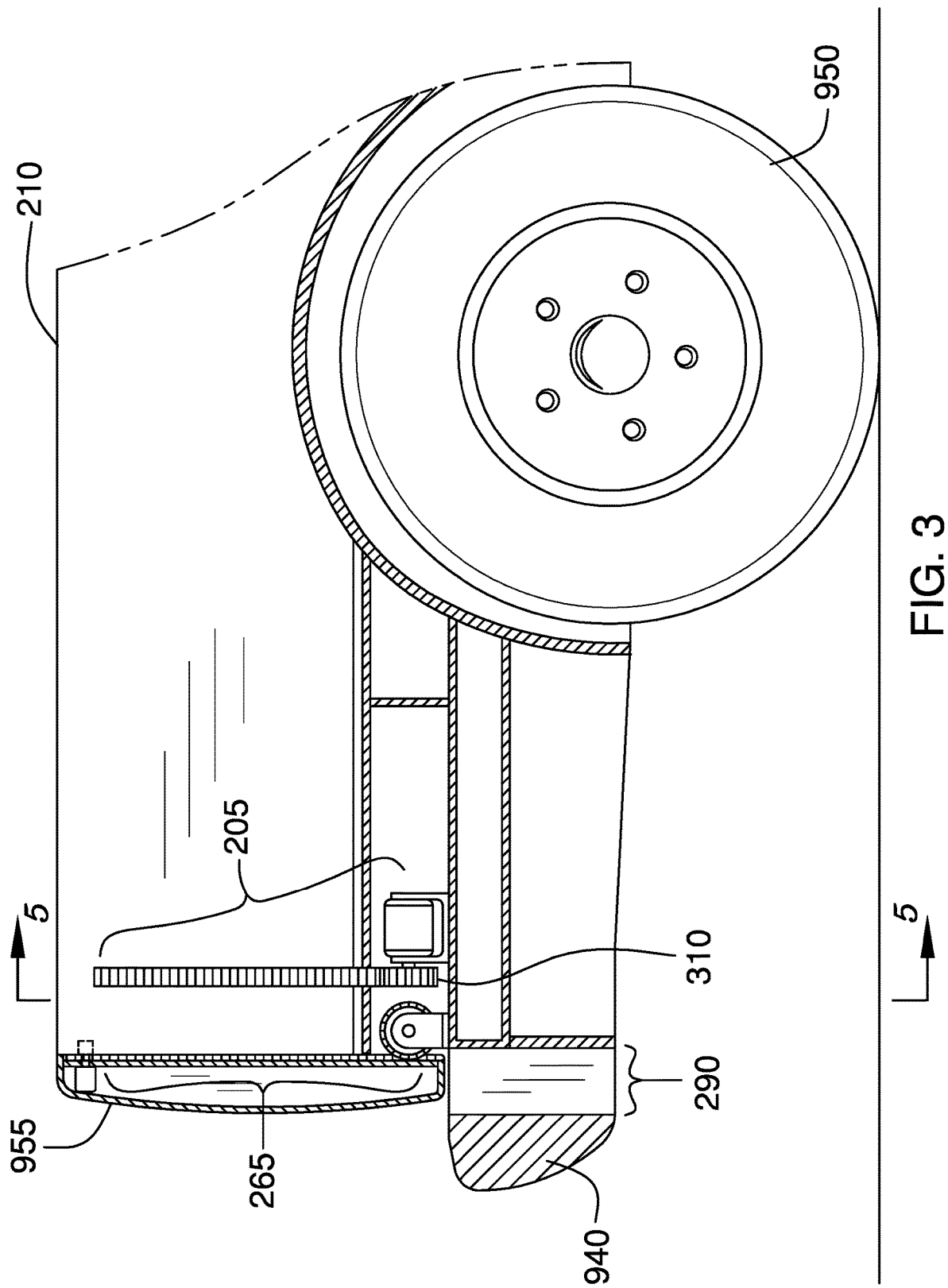
FIG. 3 is a cross-sectional view of an embodiment of the disclosure across 3-3 as shown in FIG. 1.
Figure 4:
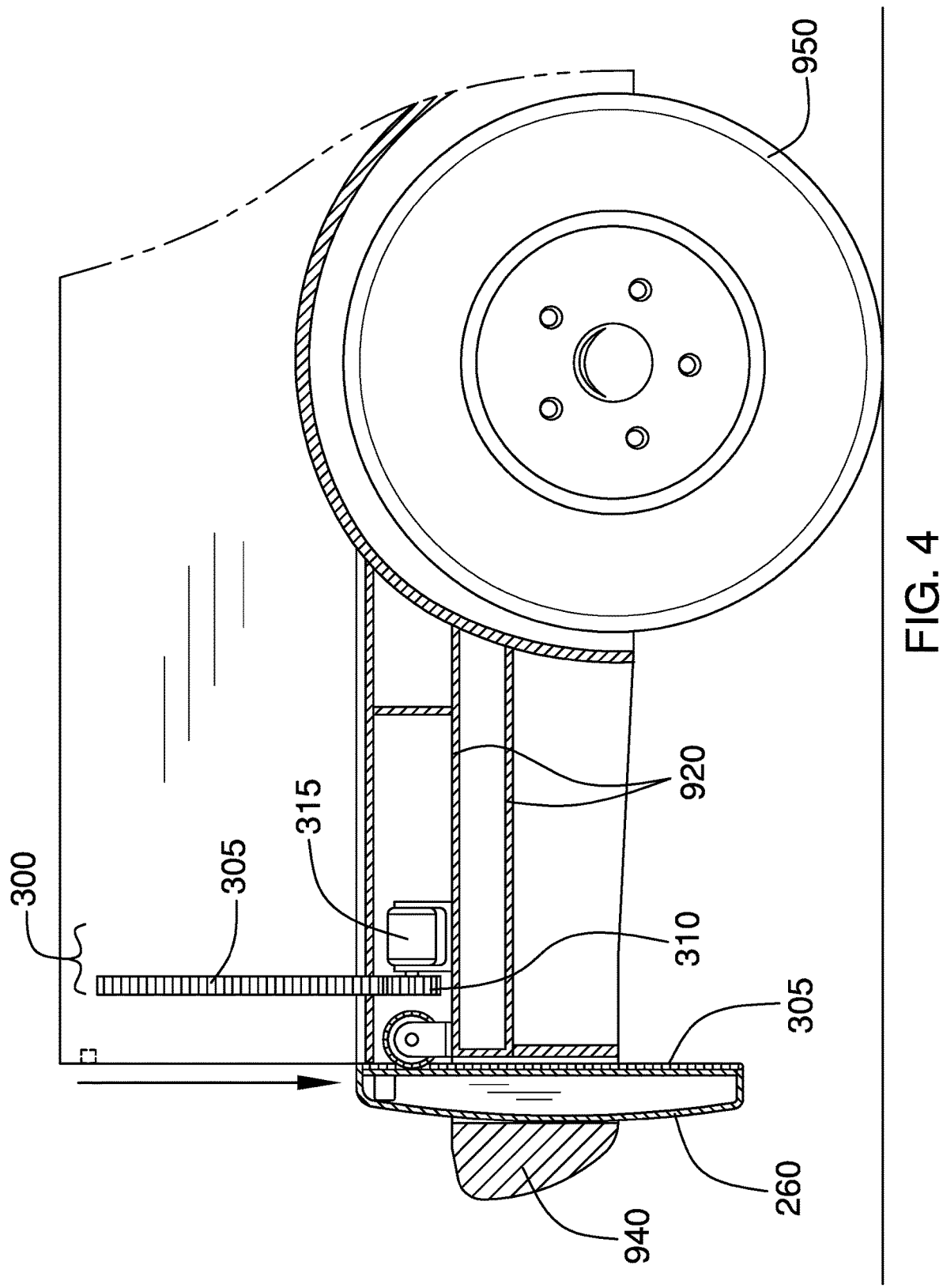
FIG. 4 is the cross-sectional view of an embodiment of the disclosure shown in FIG. 3 with the drop down tailgate moved to the down position.
Figure 5:
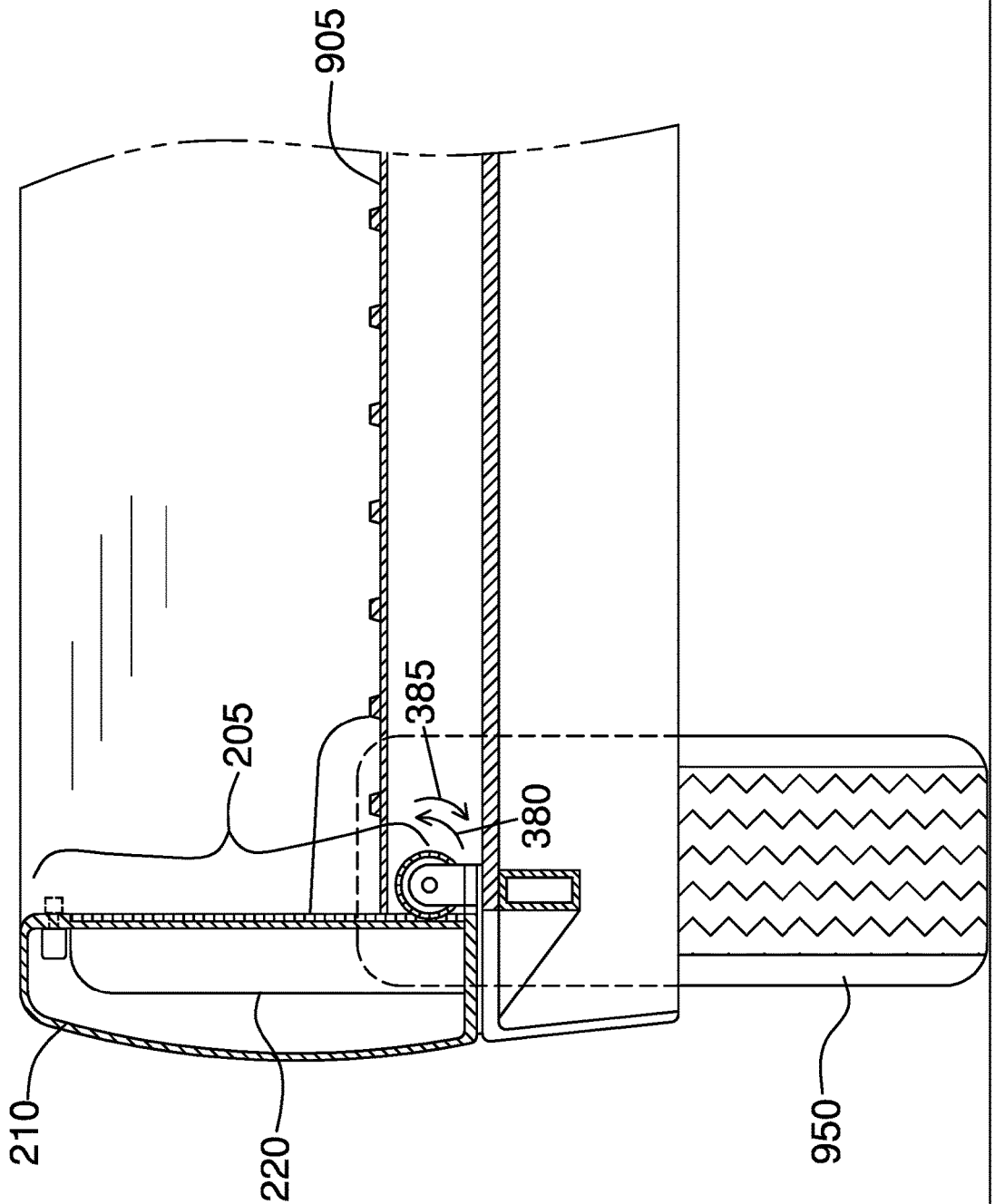
FIG. 5 is a cross-sectional view of an embodiment of the disclosure across 5-5 as shown in FIG. 3.
Figure 6:
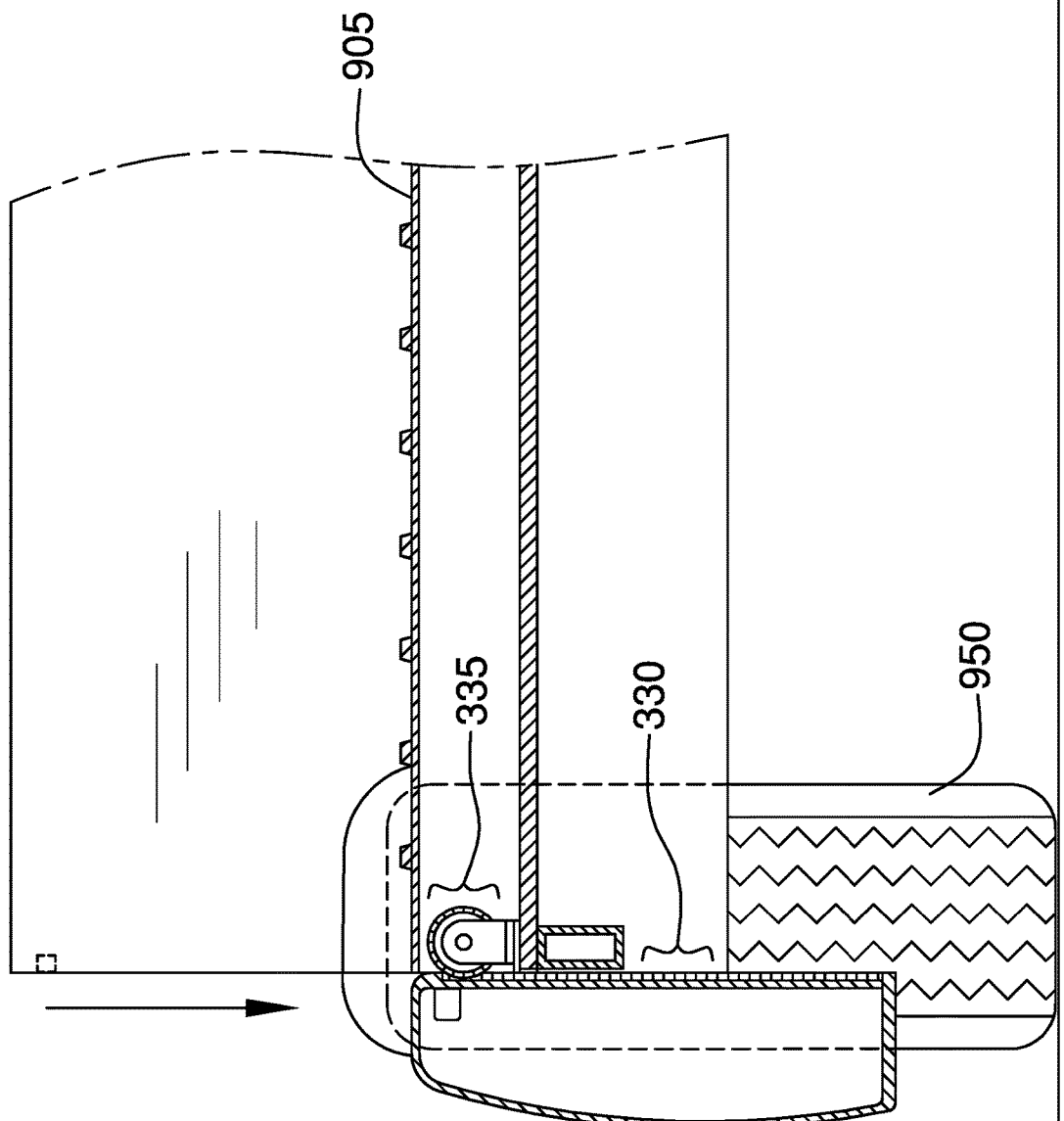
FIG. 6 is the cross-sectional view of an embodiment of the disclosure shown in FIG. 5 with the drop down left side panel moved to the down position.

Detailed reference will now be made to a first potential embodiment of the disclosure, which is illustrated in FIGS. 1 through 6.

The pickup truck with drop-down side panels 100 (hereinafter invention) comprises a drop down left side panel 200, a drop down right side panel 230, and a drop down tailgate 260. The invention 100 is a truck 900 with the drop down left side panel 200, the drop down right side panel 230, and the drop down tailgate 260 that drop down to convert a cargo area 925 of the truck 900 from a pickup truck into a flatbed truck. The movement of the drop down left side panel 200, the drop down right side panel 230, and the drop down tailgate 260 is reversible so that the flatbed truck can be converted back into the pickup truck.

When the drop down left side panel 200, the drop down right side panel 230, and the drop down tailgate 260 are in a up position 400, they may surround a truck bed 905. As a non-limiting example, with the drop down left side panel 200, the drop down right side panel 230, and the drop down tailgate 260 in the up position 400 the cargo area 925 may be suitable for hauling sand, soil, bricks, tools, equipment, or other loads requiring confinement. When the drop down left side panel 200, the drop down right side panel 230, and the drop down tailgate 260 are in a down position 410, they may expose the truck bed 905. As a non-limiting example, with the drop down left side panel 200, the drop down right side panel 230, and the drop down tailgate 260 in the up position 400 the cargo area 925 may be suitable for hauling plywood, drywall, oversized boxes, and other loads that will not fit within the cargo area 925 of the truck 900.

The drop down left side panel 200 comprises a left side panel body 210 and one or more left side height adjusters 205. The one or more left side height adjusters 205 may move the left side panel body 210 up and down on the left side of the cargo area 925.

The left side panel body 210 may be a wall for the left side of the cargo area 925. The left side panel body 210 may comprise an outer shell of sheet metal, fiberglass, plastic, or a combination thereof. The left side panel body 210 may comprise a left internal frame for support. Longitudinally, the left side panel body 210 may run from the rear of a cab 930 to the drop down tailgate 260. Laterally, the left side panel body 210 may extend from the left edge of the truck bed 905 to a point beyond the outside sidewall of a left wheel 950. Vertically, the left side panel body 210 may extend from the top of a rear bumper 940 to the bottom of a rear window 945.

The left side panel body 210 may comprise a left wheel well 220. The left wheel well 220 may be a concavity of the interior surface of the left side panel body 210 that provides clearance for the left wheel 950 when the left side panel body 210 is in the down position 410. Longitudinally, the left wheel well 220 may run from a point in front of the left wheel 950 to a point behind the left wheel 950. Laterally, the left wheel well 220 may run from the interior surface of the left side panel body 210 to a point to the left of the left wheel 950. Vertically, the left wheel well 220 may run from the bottom of the left side panel body 210 to a point above the left wheel 950 when the left side panel body 210 is in the down position 410.

The one or more left side height adjusters 205 may raise and lower the drop down left side panel 200. When activated, the one or more left side height adjusters 205 may move the drop down left side panel 200 to the down position 410. When deactivated, the one or more left side height adjusters 205 may move the drop down left side panel 200 to the up position 400.

The drop down right side panel 230 comprises a right side panel body 240 and one or more right side height adjusters 235. The one or more right side height adjusters 235 may move the right side panel body 240 up and down on the right side of the cargo area 925.

The right side panel body 240 may be a wall for the right side of the cargo area 925. The right side panel body 240 may comprise an outer shell of sheet metal, fiberglass, plastic, or a combination thereof. The right side panel body 240 may comprise a right internal frame for support. Longitudinally, the right side panel body 240 may run from the rear of the cab 930 to the drop down tailgate 260. Laterally, the right side panel body 240 may extend from the right edge of the truck bed 905 to a point beyond the outside sidewall of a right wheel 955.

Vertically, the right side panel body 240 may extend from the top of the rear bumper 940 to the bottom of the rear window 945. The right side panel body 240 may comprise a right wheel well 250. The right wheel well 250 may be a concavity of the interior surface of the right side panel body 240 that provides clearance for the right wheel 955 when the right side panel body 240 is in the down position 410. Longitudinally, the right wheel well 250 may run from a point in front of the right wheel 955 to a point behind the right wheel 955. Laterally, the right wheel well 250 may run from the interior surface of the right side panel body 240 to a point to the right of the right wheel 955. Vertically, the right wheel well 250 may run from the bottom of the right side panel body 240 to a point above the right wheel 955 when the right side panel body 240 is in the down position 410.

The one or more right side height adjusters 235 may raise and lower the drop down right side panel 230. When activated, the one or more right side height adjusters 235 may move the drop down right side panel 230 to the down position 410. When deactivated, the one or more right side height adjusters 235 may move the drop down right side panel 230 to the up position 400.

The drop down tailgate 260 comprises a tailgate body 270 and one or more tailgate height adjusters 265. The drop down tailgate 260 may hinge at the bottom of the drop down tailgate to allow the rear of the cargo area 925 to open for inserting or removing a load, as tailgates in the prior art are known to do. When closed, the drop down tailgate 260 may be vertical and the ends of the drop down tailgate 260 may align with the drop down left side panel 200 and the drop down right side panel 230 to surround the cargo area 925. When open, the top of the drop down tailgate 260 may pivot backwards and down with the bottom of the drop down tailgate 260 remaining stationary. The one or more tailgate height adjusters 265 may move the tailgate body 270 up and down on the rear side of the cargo area 925.

The tailgate body 270 may be a wall for the rear side of the cargo area 925. The tailgate body 270 may comprise an outer shell of sheet metal, fiberglass, plastic, or a combination thereof. The tailgate body 270 may comprise a tailgate internal frame for support. Longitudinally, the tailgate body 270 may run from the rear edge of the drop down left side panel 200 and the rear edge of the drop down right side panel 230 to a point in front of a tailgate slot 290. The tailgate body 270 may be free to move vertically into and out of the tailgate slot 290. Laterally, the tailgate body 270 may extend from the drop down left side panel 200 to the drop down right side panel 230. The tailgate body 270 may be free to move vertically between the drop down left side panel 200 and the drop down right side panel 230. Vertically, the tailgate body 270 may extend from the top of the rear bumper 940 to a height matching the top of the drop down left side panel 200 and the top of the drop down right side panel 230.

The one or more tailgate height adjusters 265 may raise and lower the drop down tailgate 260. When activated, the one or more tailgate height adjusters 265 may move the drop down tailgate 260 to the down position 410. When deactivated, the one or more tailgate height adjusters 265 may move the drop down tailgate 260 to the up position 400.

The rear bumper 940 may comprise the tailgate slot 290 through which the drop down tailgate 260 may travel when the drop down tailgate 260 is closed and the drop down tailgate 260 is ascending or descending. Laterally, the width of the tailgate slot 290 may be at least as wide as the lateral width of the drop down tailgate 260. The depth of the tailgate slot 290 from front to back may be at least the same as the longitudinal depth of the drop down tailgate 260.

An individual height adjuster 300 selected from the one or more left side height adjusters 205, the one or more right side height adjusters 235, or the one or more tailgate height adjusters 265 may comprise a track gear 305, a drive gear 310, and a motor 315. Rotation of the drive gear 310 by the motor 315 may cause the drive gear 310 to move the track gear 305.

The track gear 305 may be a rack. The track gear 305 may be mounted vertically onto the interior surface of a panel to be moved with a plurality of track gear teeth 330 exposed to the drive gear 310. As non-limiting example, the panel to be moved may be the drop down left side panel 200, the drop down right side panel 230, the drop down tailgate 260, or a combination thereof.

The drive gear 310 may be a round gear mounted to the shaft of the motor 315. The size and shape of a plurality of drive gear teeth 335 may be complementary to the size and shape of the plurality of track gear teeth 330 such that the drive gear 310 may mesh with the track gear 305. Rotation of the drive gear 310 may cause vertical motion of the track gear 305.

The motor 315 may be mounted on a chassis 920 of the truck 900. The motor 315 may be positioned such that the drive gear 310 coupled to the shaft of the motor 315 meshes with the track gear 305 on the panel to be moved. The motor 315 may convert electrical energy into mechanical energy. The motor 315 may cause rotation of the drive gear 310 when electrical energy is applied to the motor 315. The electrical energy applied to the motor 315 may be controlled by an operator control 350. Rotation of the motor 315 in a first direction 380 may cause the panel to be moved to descend. Rotation of the motor 315 in the first direction 380 may occur when the motor 315 is energized with electrical energy having a first polarity. Rotation of the motor 315 in a second direction 385 may cause the panel to be moved to ascend. Rotation of the motor 315 in the second direction 385 may occur when the motor 315 is energized with electrical energy having a second polarity.

The operator control 350 may be mounted inside of the cab 930. The operator control 350 may energize the motor 315 with electrical energy having the first polarity, may energize the motor 315 with electrical energy having the second polarity, or may remove electrical energy from the motor 315. The operator control 350 is therefore adapted to allow a driver to lower the drop down left side panel 200, the drop down right side panel 230, and the drop down tailgate 260, to raise the drop down left side panel 200, the drop down right side panel 230, and the drop down tailgate 260, or to stop movement of the drop down left side panel 200, the drop down right side panel 230, and the drop down tailgate 260.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, "cargo" refers to one or more objects that are intended to be transported using a vehicle.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, "energize" refers to the application of an electrical potential to a system or subsystem.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "gear" is a toothed wheel, cylinder, or other toothed mechanical element that is used to transmit motion, a change of speed, or a change of direction to second toothed wheel, cylinder, or other toothed mechanical element.

As used in this disclosure, a "hinge" is a device that permits the turning, rotating, or pivoting of a first object relative to a second object.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used in this disclosure, a "motor" refers to a device that transforms energy from an external power source into mechanical energy.

As used herein, "oversized" refers to a component that is larger than required or larger than normal. As a non-limiting example, an oversized hole may be a hole that is a larger diameter than is required to allow another component to pass through the hole. Oversizing may sometimes be used to reduce friction or to relax tolerances. An "oversized load" may refer to a cargo that requires special handling due to clearance concerns.

As used in this disclosure, a "pickup truck" is a vehicle having an enclosed cab and an open body comprising low sides and a tailgate. The vehicle is typically powered by an internal combustion engine.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used here, "rack" refers to a cogged or toothed bar or rail that engages with a gear or pinion. Rotation of the gear may cause movement of the rack or vice versa.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "shell" is a structure that forms an outer covering intended to contain an object. Shells are often, but not necessarily always, rigid or semi-rigid structures that are intended to protect the object contained within it. Some shells may only partially cover the exterior surface of the object.

As used in this disclosure, a "slot" is a long narrow groove, cut, opening, or aperture that is formed in or through an object.

As used in this disclosure, a "tailgate" is a hinged door mounted on the rear of a pickup truck that can be pivoted open and, in some embodiments, removed in order to facilitate loading of the pickup truck.

As used in this disclosure, a "track" is a device that is used to control the path of motion of an object in at least one dimension.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pickup truck with drop-down side panels comprising:
a drop down left side panel, a drop down right side panel, and a drop down tailgate;
wherein the pickup truck with drop-down side panels is a truck with the drop down left side panel, the drop down right side panel, and the drop down tailgate that drop down to convert a cargo area of the truck from a pickup truck into a flatbed truck;
wherein the movement of the drop down left side panel, the drop down right side panel, and the drop down tailgate is reversible so that the flatbed truck can be converted back into the pickup truck;
wherein the drop down left side panel comprises a left side panel body and one or more left side height adjusters;
wherein the drop down right side panel comprises a right side panel body and one or more right side height adjusters;
wherein the drop down tailgate comprises a tailgate body and one or more tailgate height adjusters;
wherein an individual height adjuster selected from the one or more left side height adjusters, the one or more right side height adjusters, or the one or more tailgate height adjusters comprises a track gear, a drive gear, and a motor;
wherein rotation of the drive gear by the motor causes the drive gear to move the track gear;
wherein the track gear is a rack;
wherein the track gear is mounted vertically onto the interior surface of a panel to be moved with a plurality of track gear teeth exposed to the drive gear;
wherein the motor is mounted on a chassis of the truck;
wherein the motor is positioned such that the drive gear coupled to the shaft of the motor meshes with the track gear on the panel to be moved;
wherein the motor converts electrical energy into mechanical energy;
wherein the motor causes rotation of the drive gear when electrical energy is applied to the motor;
wherein the electrical energy applied to the motor is controlled by an operator control;
wherein rotation of the motor in a first direction causes the panel to be moved to descend;
wherein rotation of the motor in the first direction occurs when the motor is energized with electrical energy having a first polarity;
wherein rotation of the motor in a second direction causes the panel to be moved to ascend;
wherein rotation of the motor in the second direction occurs when the motor is energized with electrical energy having a second polarity.

2. The pickup truck with drop-down side panels according to claim 1
wherein when the drop down left side panel, the drop down right side panel, and the drop down tailgate are in a up position, they surround a truck bed;
wherein when the drop down left side panel, the drop down right side panel, and the drop down tailgate are in a down position, they expose the truck bed.

3. The pickup truck with drop-down side panels according to claim 2
wherein the one or more left side height adjusters move the left side panel body up and down on the left side of the cargo area.

4. The pickup truck with drop-down side panels according to claim 3
wherein the left side panel body is a wall for the left side of the cargo area;
wherein the left side panel body comprises an outer shell of sheet metal, fiberglass, plastic, or a combination thereof;
wherein the left side panel body runs longitudinally from the rear of a cab to the drop down tailgate;
wherein the left side panel body extends laterally from the left edge of the truck bed to a point beyond the outside sidewall of a left wheel;
wherein the left side panel body extends vertically from the top of a rear bumper to the bottom of a rear window.

5. The pickup truck with drop-down side panels according to claim 4
wherein the left side panel body comprises a left wheel well;

wherein the left wheel well is a concavity of the interior surface of the left side panel body that provides clearance for the left wheel when the left side panel body is in the down position;

wherein the left wheel well runs longitudinally from a point in front of the left wheel to a point behind the left wheel;

wherein the left wheel well runs laterally from the interior surface of the left side panel body to a point to the left of the left wheel;

wherein the left wheel well runs vertically from the bottom of the left side panel body to a point above the left wheel when the left side panel body is in the down position.

6. The pickup truck with drop-down side panels according to claim 5 wherein the one or more left side height adjusters raise and lower the drop down left side panel;

wherein when activated, the one or more left side height adjusters move the drop down left side panel to the down position;

wherein when deactivated, the one or more left side height adjusters move the drop down left side panel to the up position.

7. The pickup truck with drop-down side panels according to claim 6 wherein the one or more right side height adjusters move the right side panel body up and down on the right side of the cargo area.

8. The pickup truck with drop-down side panels according to claim 7 wherein the right side panel body is a wall for the right side of the cargo area;

wherein the right side panel body comprises an outer shell of sheet metal, fiberglass, plastic, or a combination thereof;

wherein the right side panel body runs longitudinally from the rear of the cab to the drop down tailgate;

wherein the right side panel body extends laterally from the right edge of the truck bed to a point beyond the outside sidewall of a right wheel;

wherein the right side panel body extends vertically from the top of the rear bumper to the bottom of the rear window.

9. The pickup truck with drop-down side panels according to claim 8 wherein the right side panel body comprises a right wheel well;

wherein the right wheel well is a concavity of the interior surface of the right side panel body that provides clearance for the right wheel when the right side panel body is in the down position;

wherein the right wheel well runs longitudinally from a point in front of the right wheel to a point behind the right wheel;

wherein the right wheel well runs laterally from the interior surface of the right side panel body to a point to the right of the right wheel;

wherein the right wheel well runs vertically from the bottom of the right side panel body to a point above the right wheel when the right side panel body is in the down position.

10. The pickup truck with drop-down side panels according to claim 9 wherein the one or more right side height adjusters raise and lower the drop down right side panel;

wherein when activated, the one or more right side height adjusters move the drop down right side panel to the down position;

wherein when deactivated, the one or more right side height adjusters move the drop down right side panel to the up position.

11. The pickup truck with drop-down side panels according to claim 10 wherein the one or more tailgate height adjusters move the tailgate body up and down on the rear side of the cargo area.

12. The pickup truck with drop-down side panels according to claim 11 wherein the tailgate body is a wall for the rear side of the cargo area;

wherein the tailgate body comprises an outer shell of sheet metal, fiberglass, plastic, or a combination thereof;

wherein the tailgate body runs longitudinally from the rear edge of the drop down left side panel and the rear edge of the drop down right side panel to a point in front of a tailgate slot;

wherein the tailgate body is free to move vertically into and out of the tailgate slot;

wherein the tailgate body extends laterally from the drop down left side panel to the drop down right side panel;

wherein the tailgate body is free to move vertically between the drop down left side panel and the drop down right side panel;

wherein the tailgate body extends vertically from the top of the rear bumper to a height matching the top of the drop down left side panel and the top of the drop down right side panel.

13. The pickup truck with drop-down side panels according to claim 12 wherein the one or more tailgate height adjusters raise and lower the drop down tailgate;

wherein when activated, the one or more tailgate height adjusters move the drop down tailgate to the down position;

wherein when deactivated, the one or more tailgate height adjusters move the drop down tailgate to the up position.

14. The pickup truck with drop-down side panels according to claim 13 wherein the rear bumper comprises the tailgate slot through which the drop down tailgate travels when the drop down tailgate is closed and the drop down tailgate is ascending or descending;

wherein the lateral width of the tailgate slot is at least as wide as the lateral width of the drop down tailgate;

wherein the depth of the tailgate slot from front to back is at least the same as the longitudinal depth of the drop down tailgate.

15. The pickup truck with drop-down side panels according to claim 14 wherein the panel to be moved is the drop down left side panel, the drop down right side panel, the drop down tailgate, or a combination thereof.

16. The pickup truck with drop-down side panels according to claim 14 wherein the drive gear is a round gear mounted to the shaft of the motor;

wherein the size and shape of a plurality of drive gear teeth are complementary to the size and shape of the plurality of track gear teeth such that the drive gear meshes with the track gear;

wherein rotation of the drive gear causes vertical motion of the track gear.

17. The pickup truck with drop-down side panels according to claim 16
wherein the operator control is mounted inside of the cab;
wherein the operator control energizes the motor with electrical energy having the first polarity, energizes the motor with electrical energy having the second polarity, or removes electrical energy from the motor;
wherein the operator control is adapted to allow a driver to lower the drop down left side panel, the drop down right side panel, and the drop down tailgate, to raise the drop down left side panel, the drop down right side panel, and the drop down tailgate, or to stop movement of the drop down left side panel, the drop down right side panel, and the drop down tailgate.

\* \* \* \* \*